United States Patent [19]

Wolf

[11] 4,047,160
[45] Sept. 6, 1977

[54] STORAGE ARRANGEMENT HAVING A DEVICE TO DETERMINE FREE STORAGE LOCATIONS

[75] Inventor: Gerhard Wolf, Munich, Germany

[73] Assignee: Siemens Aktiengesellschaft, Berlin & Munich, Germany

[21] Appl. No.: 654,645

[22] Filed: Feb. 2, 1976

[30] Foreign Application Priority Data

Feb. 10, 1975 Germany ............................ 2505478

[51] Int. Cl.² .............................................. G06F 13/00
[52] U.S. Cl. .................................................... 364/900
[58] Field of Search ..................... 340/172.5, 173 AM

*Primary Examiner*—James D. Thomas
*Attorney, Agent, or Firm*—Hill, Gross, Simpson, Van Santen, Steadman, Chiara & Simpson

[57] ABSTRACT

A storage arrangement is used as an associative memory having a main memory serving to accommodate the data composed of an associative component (association word) and a non-associative component. A comparator device serves to compare the associative part of the read-out data with a search word and address converters serve to derive storage addresses from the association word or the search word or from parts of such words (prefix). An extension counter is provided whose count influences the address derivation and is increased by one whenever an initially addressed storage position proves otherwise engaged. The main memory comprises a linearly addressed storage bank which is divided into a plurality of pages each comprising a plurality of rows. Each row contains one storage position for accommodating the data, and the sections for accommodating reference characteristics. Separate address covers are provided for the formation of the page and row addresses and the extension counter co-determines the derivation of the page address in accordance with its relevant count. A book-keeping memory, which is read out row-by-row comprises a plurality of rows each having a plurality of bit positions. Each row of the book-keeping memory is assigned to a page and each bit position is assigned to a row of the main memory. Seizure of the bit positions of the book-keeping memory provides information on seizure of the main memory and the book-keeping memory is assigned a book-keeping control unit which controls the setting and the interrogation of markings in the book-keeping memory for seized storage positions in the main memory and the selection of equivalent storage positions.

11 Claims, 9 Drawing Figures

STORAGE ARRANGEMENT HAVING A DEVICE TO DETERMINE FREE STORAGE LOCATIONS

BACKGROUND OF THE INVENTION

1. Field of the Invention

The present invention relates to an associatively operated storage arrangement having a main memory which serves to accommodate data in the form of an associative component and a nonassociative component, a comparator device serving to compare the associative part of the read-out data with a search word, address converters serving to derive the storage addresses from the association word or from a search word or from parts of these words, and an extension counter whose count influences the address derivation and is increased by one whenever an initially addressed storage position proves otherwise engaged.

2. Description of the Prior Art

The German published application No. 2,319,468 discloses a storage device comprising a plurality of storage banks which, in turn, comprise a plurality of storage positions, which are in each case classified into an associative section which can be addressed by one part (prefix) of an association word, and into a nonassociative section which serves to accommodate an assigned word, where each storage bank is assigned address converters serving to derive the addresses from the association word in a manner which differs from storage bank to storage bank and having a pseudo-statistical distribution in such a manner that the prefix lines which connect the storage positions to one another form irregular lines, each storage position being able to be addressed by specific prefixes. All of the contents on a prefix line are read-out simultaneously.

A chance accumulation of association words having the same prefix can give rise to the situation that the storage positions available along a prefix line are not sufficient for the entry of the words. Therefore, the storage device is provided with an extension counter, the relevant count of which co-determines the formation of the addresses and is increased by one whenever a new entry of a word having a specific prefix is to be made and all the storage positions along the relevant prefix line are already in use. Thus, with the aid of the extension counter, additional addressing planes are provided which are capable of accommodating extensions of prefix line.

A possibility of surveying the state of seizure along a prefix line considerably simplifies the allocation of free storage positions for new entries. When 8 storage banks are employed in the storage device, when the memory is up to approximately 70% full, only in a few cases will it be necessary to conduct a second search cycle to indicate a free storage position. Not until the store is approximately 95% full will, on the average, two search cycles be required triggered.

SUMMARY OF THE INVENTION

In the event of the reduction of the number of storage banks, however, conditions rapidly become more unfavorable. It becomes more and more difficult to survey the state of the seizure and, because of the shortening of the prefix lines, there is increasingly less possibility of selection between equivalent storage positions. However, it is desirable to be able to use a high-capacity linearly addressable memory with only one storage bank as an associative memory. Therefore, the primary object of the present invention is to provide measures which, in the case of the use of a linearly addressable memory with one storage bank, permit the state of seizure to be surveyed, and permit the allocation of equivalent storage positions for new entries with a viable time outlay and which facilitate a high-speed relocation of the entries.

In a storage arrangement of the type described above, this object is realized in that a main memory comprises a linearly addressed storage bank, which bank is divided into $a$ pages each comprising $b$ rows, and each row contains one storage position for the accommodation of data and sections for the accommodation of reference characteristics. Separate address converters are provided for the formation of the page and row addresses of the main memory and the extension counter co-determines the derivation of the page address in accordance with its relevant count. A book-keeping memory which can be read-out row-by-row and which comprises $a$ rows each having $b$ bit positions is provided, each row of the book-keeping memory being assigned to a page of the main memory and each bit position of the book-keeping memory being assigned to a row of the main memory. The seizure of the bit positions of the book-keeping memory provides information concerning the seizure of the main memory and the book-keeping memory is assigned a book-keeping control unit which controls the setting and the interrogation of markings in the book-keeping memory for seized storage positions in the main memory and the selection of equivalent storage positions.

The storage arrangement constructed in accordance with the invention possesses, in particular, the advantage that the main memory can be optionally operated as a conventionally linearly addressed memory or as an associative memory. Both modes of operation can also be carried out simultaneously in different portions of an appropriately large main memory.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
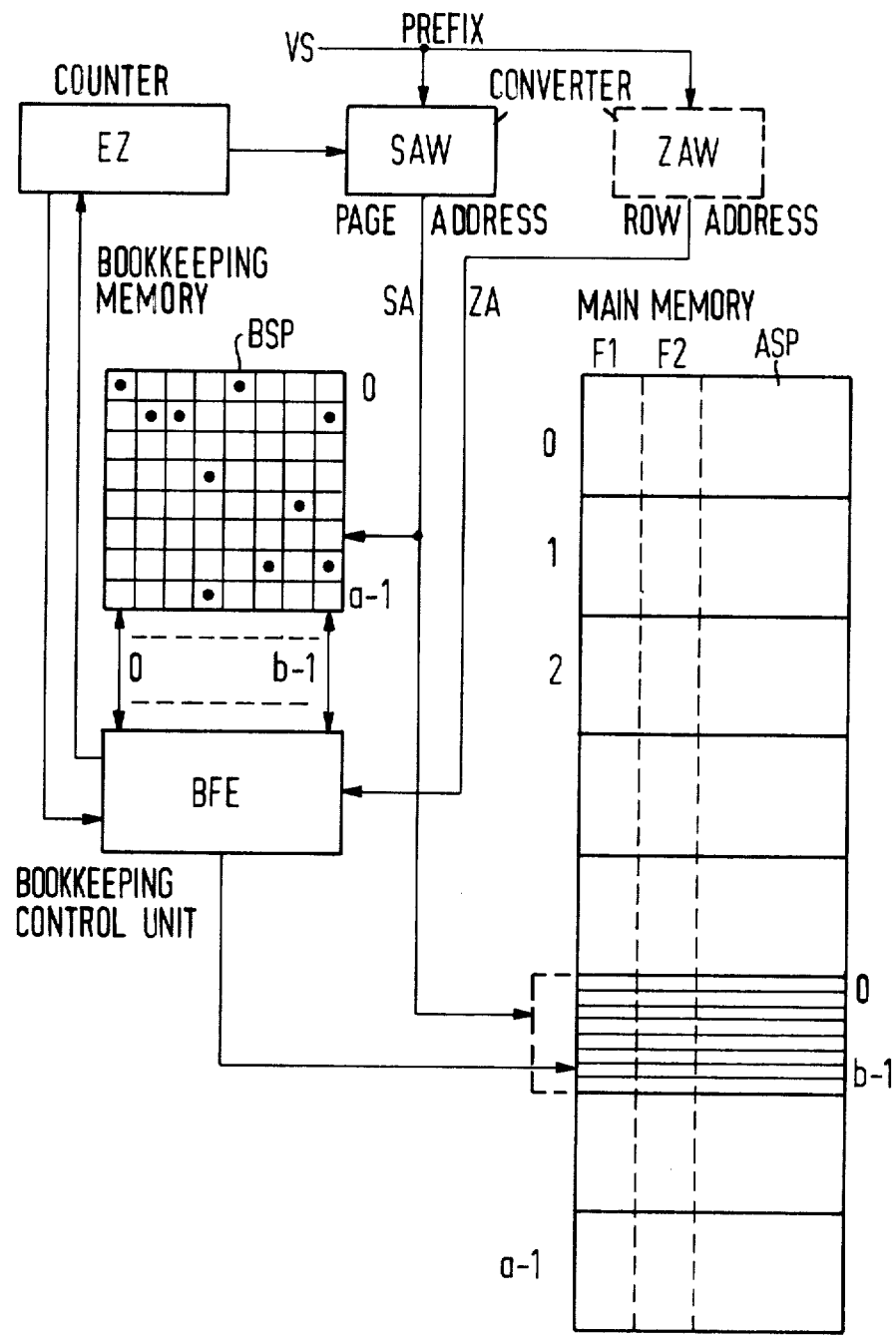
FIG. 1 is a block diagram of a storage device constructed in accordance with the invention.

The main memory ASP illustrated in FIG. 1 is a linearly addressable memory. For reasons of organization, the main memory is divided into portions $\phi$ to $a-l$, which in the following will be referred to as pages. Each page comprises $b$ rows $\phi$ to $b-l$. The storage rows comprise, in addition to a storage position for the data consisting of an associative part (association word) and a non-associative part, also additional sections for the entry of characteristics which will be discussed in the following. A comparator which is required for the associative comparison of the read-out data with the particular search word is not illustrated in FIG. 1. Also not shown are a mask register, whose variable content permits the extension or restriction of the zone taken into consideration in the associative comparison, and the address decoder required for selecting the storage positions and storage rows. All of these elements are well known to those skilled in the art.

The possibility of surveying the state of seizure of the main memory ASP necessary for the allocation of free storage positions there is achieved by means of a small book-keeping memory BSP. As the book-keeping memory BSP is divided into $a$ rows each comprising $b$ 1-bit cells, each row in the main memory ASP can be assigned a 1-bit cell in which a marking bit is set when the relevant row of the main memory is seized. Therefore, the address for one page of the main memory ASP corresponds to the address of one row of the book-keeping memory BSP and the address of the one row of the main memory within a page corresponds to the address of one bit position of the book-keeping memory BSP within a row. In order to avoid confusions in the following, one row of the book-keeping memory BSP will be referred to as a word.

The book-keeping memory BSP is advantageously in the form of a bipolar semiconductor memory. This can be a reserved zone of a memory which is also used for other purposes. However, a portion of the memory used as a main memory can also possibly be employed for this purpose.

The addresses for the pages and rows of the main memory are obtained, in a manner similar to that known from the German published application No. 2,319,468, from the association word and the search word or a part thereof. The bit positions of the association and search words employed for the address formation are referred to as prefix VS, irrespectively of whether the prefix VS comprises only the higher-value bit positions of the words or the entire words.

There are various possibilities of obtaining the page and row addresses of the main memory, which exhibit partially differing modes of providing new entries of association words in the main memory. As representative of the possible embodiments, in the arrangement illustrated in FIG. 1, the page address converter SAW and the row address converter ZAW are provided, where the page address converter SAW is supplied with the higher-value bit positions and the row address converter ZAW is supplied with the lower-value bit positions of the prefix VS.

The page address converter SAW which serves to form the page address SA comprises a logic linking network or a small read-only memory (ROM). The function of the row address converter ZAW is limited, however, to that of exchanging bit positions. Generally, however, the row address converter ZAW can be entirely dispensed with, so that the row address ZA (for $|EZ| = \phi$, as will be explained in the following), is identical with the lower-value bit positions of the prefix. This applies to all situations in which references made to the row address converter ZAW.

Generally speaking, as the number of storage positions in the main memory is lower than the number of combination possibilities of all of the bit positions of the association words, irrespective of the special nature of the address formation, a plurality of association words always lead to the same addresses. Therefore, it will frequently occur that a storage position in the main memory, selected by the original page and row address, proves already engaged when a new association word is to be stored. However, due to the fact that the state of seizure of the main memory ASP is portrayed in the book-keeping memory BSP, an equivalent storage position for the waiting entry can be allocated, both easily and rapidly. For this purpose, an extension counter EZ (FIG. 1) is provided, the relevant count of the extension counter co-determining the formation of the page addresses and being increased up from zero by one counting unit whenever the previously addressed storage position is already seized. In this manner, a chain of association words, similar to one another, is built up, all of which association words would initially lead once to the same addresses of the main memory.

Figure 2:
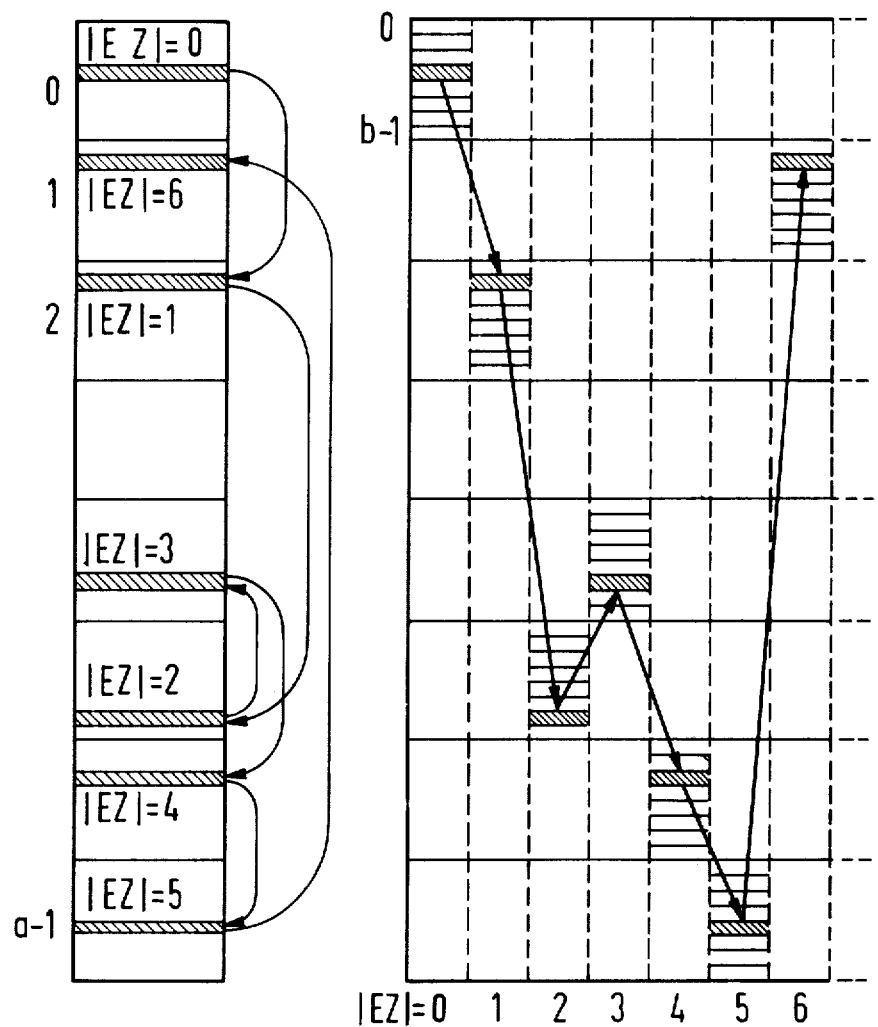
FIG. 2 is a schematic illustration of the allocation of equivalent storage positions and the courses of a chaining line in dependence upon the count of the extension counter.

The left-hand side of FIG. 2 schematically illustrates the main memory which is divided into pages and in which the shaded rows are filled with entries which form a chain. At every entry the count $|EZ|$ (EZ count) of the extension counter EZ is provided which cogoverned the derivation of the relevant memory address.

On the right-hand side of FIG. 2 are entered the elements (addresses) belonging to the chain, over the EZ count. The arrows which connect the individual elements to one another form an irregular line which is referred to as a chaining line. One and only one such chaining line can begin in each row of the main memory. However, it is not necessary for the chaining line to proceed into another page of the main memory each time the EZ count is changed. It can also occur that individual EZ counts are skipped over, because the main memory pages addressed with the cooperation of the skipped EZ counts are already fully seized.

It is advantageous to use the address derived by the row address converter ZAW from the prefix for addressing the storage position only for the particular first element, i.e. at the count $|EZ| = \phi$. For entries of other elements ($|EZ| > \phi$) free storage positions are determined within the selected pages with the aid of the markings in the book-keeping memory BSP. To this end, for example, a scanner accommodated in the book-keeping control unit BFE scans all the bit positions of the word selected by the page address of the main memory in turn, and thus (generally) comes across a free storage position with the relevant highest or lowest number (priority).

It is possible to find the free storage position with the highest (lowest) priority within the selected main memory page considerably more rapidly if the read-out signals of all of the bit positions of the corresponding book-keeping memory word are simultaneously fed to a priority network provided in the book-keeping memory control unit BFE, which, because of the fixed address assignment, directly supplies from its output the address of the free storage position within the selected page.

The systematic construction of a chaining line and the relocation of the association words stored along the chaining line requires that reference characteristics be entered in the sections assigned to each storage position. All of the reference characteristics consist of the indication of a specific count of the extension counter EZ, and a row address (within a main memory page). It is advantageous to provide two sections F1 and F2 and to proceed in the following manner.

Figure 3:
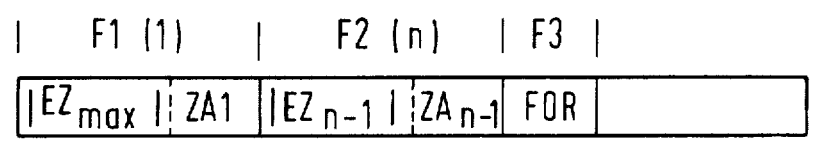
FIG. 3 illustrates the entry of reference characteristics in sections of a storage row assigned to a storage position.
Figure 4:
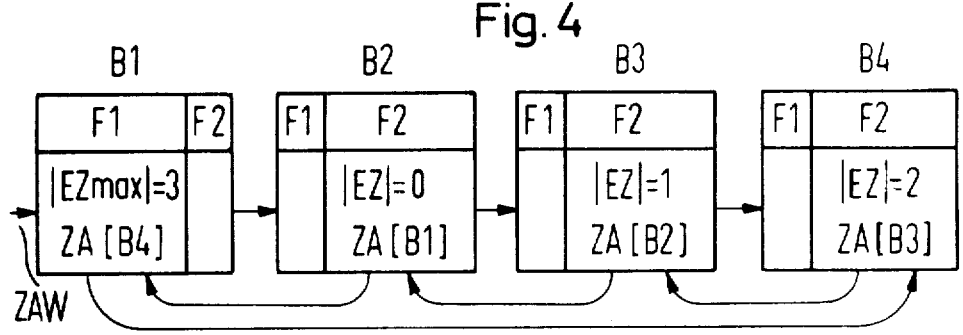
FIG. 4 is a schematic illustration of the characteristics of a chain.

The section F1 of the initial element of a chain (initial row) contains a reference to the relevant end of the chain. The sections F2 of all of the other elements contain information relating to the particular preceding element. Consequently, in the event of the storage of a word for which a free storage position has been immediately found under the page and row address obtained from the prefix, the count $|EZ| = \phi$ and the relevant row address ZA are entered into the associated section F1. The section F2 remains free as there is no preceding chain element (see FIG. 3). If another word possessing the same prefix now awaits storage, then with the aid of the book-keeping memory BSP it is established that the storage row selected by the original addresses is already seized. At the same time, as a result of the read-out of the section F1, the EZ count (here $|EZ| = \phi$) is established, under which the preceding (here first) chain element has been stored. The extension counter EZ is brought to a count increased by 1 (here $|EZ| = 1$) in comparison to the EZ count which has just been established. A new page address is formed and with the aid of the book-keeping memory BSP a free storage position is found. The word awaiting storage can now be input. At the same time, the reference characteristics in the section F1 of the first chain element are corrected, and in the section F2 of the (second) element which has just been input, a reference is entered to the preceding (first) chain element. Additional association words possessing the same prefix are stored in a similar fashion. FIG. 4 illustrates the reference characteristics of a four-element chain composed of the words B1 to B4. The chain is constructed from left to right and, commencing from the section F1 on the left-hand side, is read-out or disassembled from right to left.

When the memory is to be used for the storage of association words whose format exceeds the width of one storage position, the words are divided into portions in the format of the storage positions (basic format), and the individual portions are treated like independent association words in the basic format with the same prefixes. If this possibility is to be provided, it is expedient to make available in each storage cell (row) a third section F3 (FIG. 3) to accommodate a format characteristic FOR.

Figure 5:
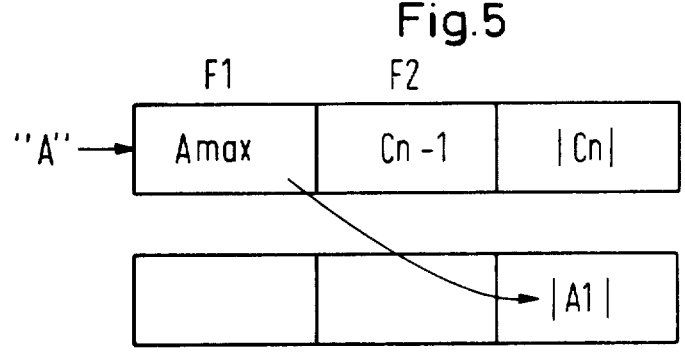
FIG. 5 illustrates reference characteristics of a chain which does not begin at the count 0 of the extension counter.

It has already been pointed out that a chaining line can only be initiated in that row which results from the prefix and the address converter function or $|EZ| = \phi$. However, in dependence upon the address converter function, the situation can occur in which the storage position of this initial row of the chaining line A has already been used by another chaining line C and has been employed for a different type of word. The word in question must then, as is illustrated in FIG. 5, be stored elsewhere. In this case, the reference to the end of the chaining line A (even when the chain initially consists of only one single element) is entered in the still free section F1 of the beginning row under $|EZ| = \phi$, and for the word itself then another free storage position is referred to under $|EZ| \geq \phi$. Therefore, the entry into a chain takes place by way of the section F1 in the beginning row with the end-reference.

The same applies to associative searching for memory contents. The prefix of the search word initially leads, with $|EZ| = \phi$ to the beginning row of the relevant chaining line. The reference in the section F1 of this row provides information on the end of the relevant chaining line, in direct fashion through the indication of the relevant row address, and in indirect fashion through the indication of the count at which the entry was made at the end of the chaining line. The extension counter EZ is set accordingly and the new page address is formed. The content of the now completely addressed memory row can now be read out. In addition to the association word, there is also a reference to the preceding element of the chain whose page address is again formed. All of the storage positions belonging to a chaining line are therefore interrogated from the end of the chain.

The erasure of stored words which do not belong to a chain, or the erasure of an entire chain presents no problems. The word is localized by an associative search process. Subsequently, the word and the associated marking bit are erased in the book-keeping memory BSP.

It is somewhat more complicated to erase words which belong to a chain, but do not form the last element of the chain. In this case, it is necessary to, in each case, shorten the chain by one element and to insert the last element into the gap which is formed. In this case the following operations are carried out:

1. An associative search operation is conducted to locate the word in the store and, because of the chaining, serial read-out operations are required.

2. Erase the word in the memory, noting the row address of the gap formed.

3. The address of the last chain element is withdrawn from the section F1 of the beginning row.

4. The last chain element is read-out, noted and erased; and the marking bit in the book-keeping memory is erased.

5. The memory content of the last chain element is immediately entered in the gap formed.

6. The end reference in the section F1 of the beginning row is corrected.

It has already been pointed out that the manner in which the addresses are derived from the association word influences the manner in which the input words are stored. The storage mode plays an important role when it is a question of sorting the memory contents in accordance with specific criteria. In the following, a few possibilities of address formation will therefore be described in detail making reference to FIGS. 6, 7 and 8, including the resultant consequences for sorting possibilities of the stored words. The numerical references which have been quoted are only to be considered as examples and relate to a main memory comprising 2048 pages, each having 32 rows.

Figure 6:
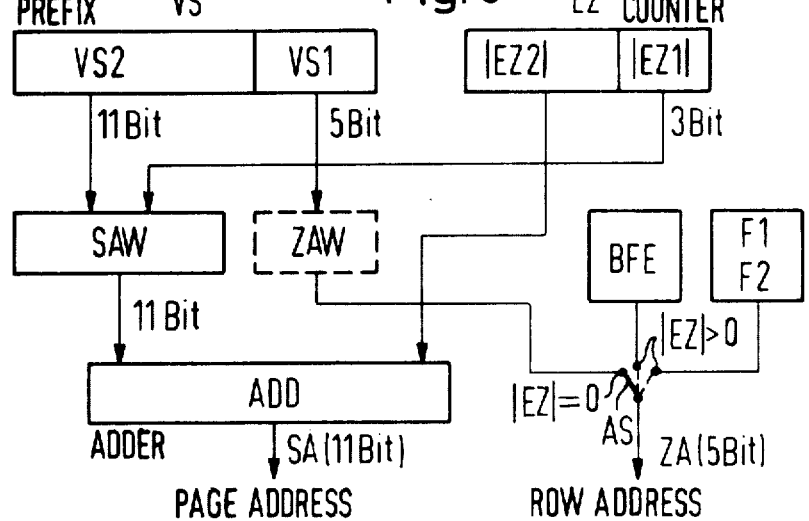
FIG. 6 is a block diagram of an exemplary embodiment of the devices for the address formation.

A first exemplary embodiment is illustrated in FIG. 6. A register REG contains the association word or the search word, in dependence upon whether a write-in cycle or a search cycle is to be carried out. The 16 highest bit values of the words intermediately stored in the register REG are employed as the prefix VS for the address formation. The prefix part VS1, composed of the 5 low-value bits, is fed to the row address converter ZAW which, at its output, supplies the row address ZA likewise comprising 5 bits. The row address converter ZAW generally recodes the input information. This counteracts a concentration of entries having similar prefixes. The row address converter can almost always be dispensed with, however, so that the part VS1 of the prefix VS directly represents the row address, as has already been mentioned above.

The prefix part VS2, containing the 11 higher-value bits of the prefix VS is processed, together with the three bits of the part |EZ| of the extension counter EZ by the page address converter SAW. The part |EZ2| of the extension counter EZ is added to the 11 bits at the output of the page address converter SAW, in the adder ADD. The result of the addition represents the page address SA for the main memory. As in the example set forth above, only the three lower-value bits of the extension counter EZ have been taken into consideration for forming the output value of the page address converter SAW, a chaining line is formed which, after 8 elements changes into a parallel arm of the first portion.

It has already been pointed out that the row address ZA derived from the prefix VS is used only to address the beginning row of a prefix line, i.e. with the count $\phi$ of the extension counter. To clarify this, FIG. 6 illustrates a symbolic transfer switch AS having three positions. The position of the switch AS shown in solid lines applies to the last-mentioned case $|EZ| = \phi$. The two other positions, illustrated by broken lines, are assumed by the switch AS whenever the count of the extension counter differs from $\phi$, $(|EZ| > \phi)$. Under this condition, the central position governs a write-in cycle in which the row address is established by the book-keeping control unit BFE with the aid of the book-keeping memory BSP. The switch AS assumes the right position during a search process in which, together with the read-out of the words along a chaining line, the addresses contained in the reference characteristics are also read out.

Words, which have been input-stored by the address formation described above, can easily be sorted in a dual-numerical or alphanumerical sequence. For sorting in a dual-numerical sequence, it is possible to employ a sorting counter which calls up all of the chaining lines, in turn, in this sequence. The individual contents which are stored along a chaining line and which have not yet been sorted from one another are conveyed into an associative register set and from the latter are emitted in the final sorting sequence. This final sorting can be carried out, for example, in accordance with a sorting process proposed in the German patent application No. P 23 42 660.0. However, this operation will not be discussed in detail herein.

As words having the same prefix can occur in the described mode of storage, it must be accepted that longer chains may arise. This hardly results in any disadvantages as far as sorting is concerned, although time losses occur in the associative searching for individual words. Therefore, it is expedient to only use this method of storage when, in particular, words are to be output sorted dual-numerically.

The last-mentioned disadvantage is avoided by means of a "diffused" storage of the words in the main memory. However, in that case the possibility of direct sorting of the memory contents is lost. Diffused storage is achieved and that the prefix employed for the address formation is extended to considerably more bit positions than are required for the addressing of the main memory.

The extension of the prefix range improves the statistical distribution of words among different chaining lines in such a manner that the number of longer chains is drastically reduced. Chains comprising more than four elements then occur extremely rarely. Accordingly, associative search processes can be handled rapidly because it is hardly likely that more serial search processes will arise.

Figure 7:
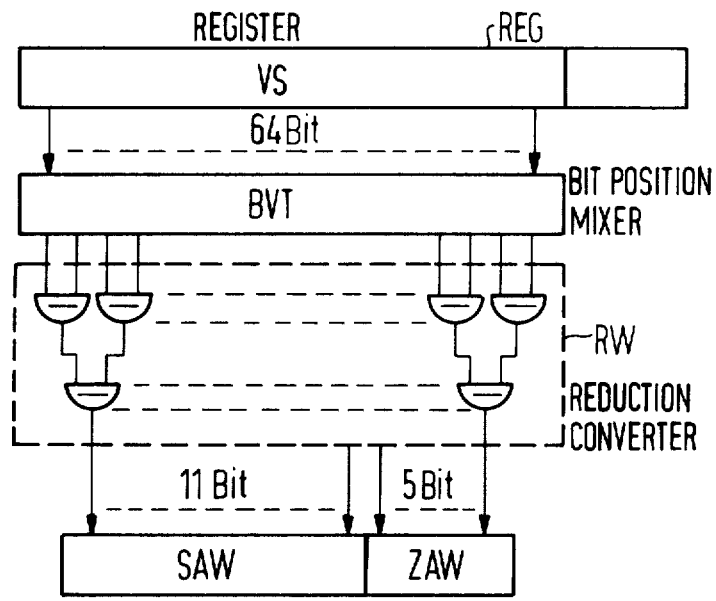
FIG. 7 is a schematic diagram of another exemplary embodiment of devices for address formation.

An exemplary embodiment for an additional device for deriving the page, addresses SA and the row addresses ZA for the main memory ASP from the extended prefix is represented in FIG. 7. The prefix VS comprising 64 bits, which is derived from the association and search words intermediately stored in the register REG is fed to a bit position mixer BVT. The 64 bits of the prefix having irregularly altered digit values are again available at the output of the bit position mixer BVT. In a reduction converter RW, the 64 bits are compressed into 16 bits. The reduction converter RW contains a logic linking network and can, for example, be constructed in the manner indicated in FIG. 7 from logic linking elements having an EXCLUSIVE-OR-function, or from "READ-ONLY-memory" (ROM) modules.

The 16 bits at the output of the reduction converter RW are now further processed in the same manner as the prefix consisting of 16 bits in FIG. 6. Thus, this means that the part comprising the 11 higher-value bits is fed to the page address converter SAW and the part comprising the 5 lower value bits is fed to the row address converter ZAW. The remainder of the address formation process thus corresponds fully to the procedure already described with reference to FIG. 6.

It has already been pointed out that, in the event of a diffused storage of the words, storing is practically impossible. A sorting counter which calls up the individual prefixes would have to execute $2^{64}$ steps in the case of a prefix comprising 64 bits. This results in a time delay which is unacceptable. If, however, it is still desirable to carry out sorting with diffused storage, relayering can be effected in a storage mode which facilitates sorting.

In the previously described storage mode which is capable of carrying out sorting, and which is achieved when the address formation device illustrated in FIG. 6 is used, accumulations of words having the same or similar prefixes occur, in particular, in the case of alphanumerical coding. As the normal codes for letters and digits cover only a part of the code table, which comprises 256 possibilities, undesirably long chainings occur, and on the other hand, many beginnings of possible chains remain unexploited.

A fundamental improvement can be achieved by a compression converter which reduces the number of bit positions of the code to the required level and eliminates all non-used combinations. The compressed prefix is conducted to the page address converter SAW and to the row address converter ZAW and is further processed in the manner described with reference to FIG. 6.

Figure 8:
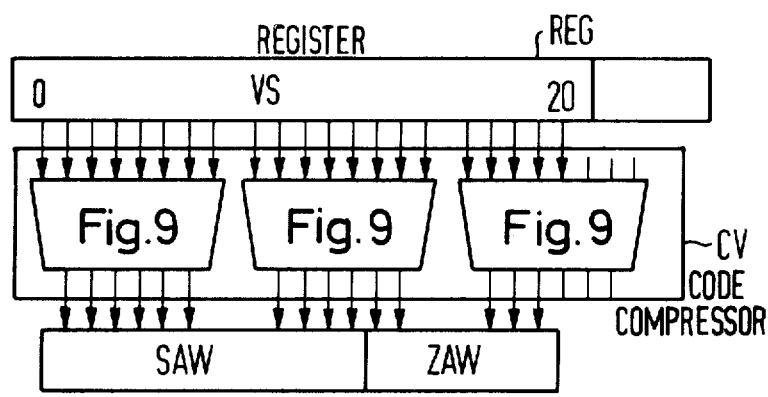
FIG. 8 is a schematic diagram of an arrangement for prefix compression.

A code compresser set up for the EBCDI code and consisting of 3 individual modules is schematically illustrated in FIG. 8. The code compressor CV employs a prefix comprising 21 bits which it compresses to 16 bits. The compressed prefix is further handled in the previous manner.

Figure 9:
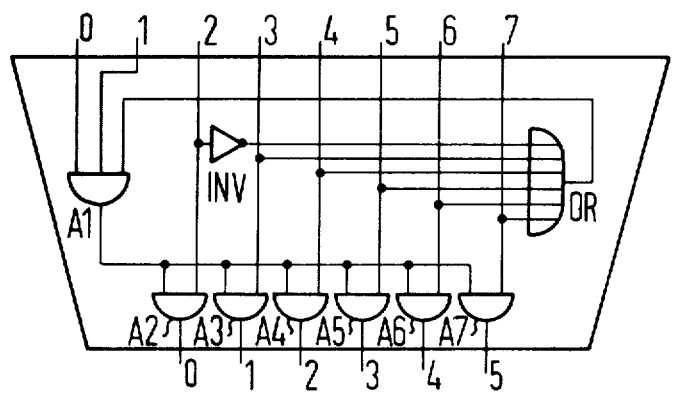
FIG. 9 is a schematic illustration of a module of the arrangement illustrated in FIG. 8.

An individual module of the code compressor CV is represented in FIG. 9. The code compressor CV has 8 input terminals $\phi - 7$ and 6 output terminals $\phi - 5$. It consists of seven AND logic linking elements A1 - A7, and OR gate and an inverter INV. The interconnections of these elements are readily apparent from the drawing. If FIGS. 8 and 9 are compared with each other, it will be seen that, in each case, three input lines and output lines are not employed in the compressor module on the right-hand side.

Although I have described my invention by reference to particular illustrative embodiments thereof, many changes and modifications of the invention may become apparent to those skilled in the art without departing from the spirit and scope of the invention. I, therefore, intend to include within the patent warranted hereon that all such changes and modifications as may reasonably and properly be included within the scope of contribution to the art.

I claim:

1. A storage arrangement for use as an associative memory, comprising:
   a main memory for storing data composed of an associative component and a non-associative component;
   a comparator device connected to said main memory to compare the associative part of data therefrom with a search word;
   said main memory comprising a linearly addressed storage bank divided into $a$ pages each including $b$ rows, each of said rows including a storage position for the data and a portion for storing reference characteristics;
   page and row address converters for providing page and row addresses in response to receipt of a prefix;
   an extension counter connected to said page address converter to co-determine page address in accordance with its relevant count and whose count is increased by one when an initially addressed storage position is engaged;
   a book-keeping memory connected to said page address converters and operated to be read row-by-row, said book-keeping memory comprising $a$ rows each including $b$ bit positions, where each row corresponds to a page and each bit position corresponds to a row of said main memory, each bit position storing a mark indicating seizure of the corresponding row of said main memory; and
   a book-keeping control unit connected to said counter, to said row address converters, to said book-keeping memory and to said main memory, and operable to control the setting and interrogation of the seizure marks and the selection of equivalent storage positions in said main memory.

2. The storage arrangement of claim 1, wherein said book-keeping control unit includes means responsive to an extension counter count EZ, where $|EZ| > \phi$, to prevent selection of a storage position in said main memory by a row formed from the prefix and assign a free storage position in said main memory for a new entry as determined by interrogation of said book-keeping memory.

3. The storage arrangement of claim 2, wherein said book-keeping control unit comprises a priority network operable to cause storage of new entries in a free row with the highest particular priority within an addressed page.

4. The storage arrangement of claim 3, wherein said page address converter comprises recoding means for recoding received data in dependence on the lower-value bits of the contents of said extension counter, said row address converter includes means for receiving and translating the number $n$ of lower-value bits of a bit combination, which is equal to the number $n$ of the bits of a row address, for input to said book-keeping control unit, the number $m$ of higher-value bits of a bit combination, equal to the number $m$ of the bits of a page address recoded by said recoding means while preserving the bit number $m$, and comprising an adder connected to said extension counter and to said page address converter for adding the higher-value bits of the contents of said extension counter to the bits supplied by said page address converter in modulo $2^m$ fashion to provide a page address.

5. The storage arrangement of claim 4, wherein said recoding means comprises a logic linking network.

6. The storage arrangement of claim 4, wherein said recoding means comprises a read only memory.

7. The storage arrangement of claim 4, comprising a bit mixer to acyclically exchange the positions of $k$ bits of an extended prefix, where $k$ is a whole-number multiple of the bits $n + m$ of a page and row address, and a reduction converter having means for reducing the $k$ bits to $n + m$ bits, said page address converter connected to receive the $m$ bits and row address converter connected to receive the $n$ bits.

8. The storage arrangement of claim 7, wherein said reduction converter comprises a read only memory.

9. The storage arrangement of claim 7, wherein said reduction converter comprises a logic linking network.

10. The storage arrangement of claim 9, wherein said logic linking network comprises a plurality of exclusive-or gates arranged in the first and second groups with the outputs of two gates of the first group connected to the inputs of a single gate of the second group.

11. The storage arrangement of claim 4, for storing association words having an alpha-numeric coding, comprising a code compressor connected in series with said page and address converters to gate out unused code combinations and eliminate redundant, where the number of the bits fed to said code compressor exceeds the $n + m$ by the number of redundant bits.

* * * * *